(12) United States Patent
Liu et al.

(10) Patent No.: US 10,945,063 B2
(45) Date of Patent: Mar. 9, 2021

(54) NECKBAND HEADSET WITH NOISE REJECTION

(71) Applicant: Plantronics, Inc., Santa Cruz, CA (US)

(72) Inventors: Cheng Liu, Suzhou (CN); John A Kelley, Santa Cruz, CA (US); Wen Song, Suzhou (CN); John S. Graham, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/533,641

(22) Filed: Aug. 6, 2019

(65) Prior Publication Data

US 2021/0044889 A1    Feb. 11, 2021

(51) Int. Cl.
| | |
|---|---|
| *H04R 1/10* | (2006.01) |
| *H04R 1/08* | (2006.01) |
| *G10L 21/0232* | (2013.01) |
| *H04R 3/00* | (2006.01) |
| *G06F 3/16* | (2006.01) |
| *H04R 1/40* | (2006.01) |

(52) U.S. Cl.
CPC .......... *H04R 1/1041* (2013.01); *G06F 3/165* (2013.01); *G10L 21/0232* (2013.01); *H04R 1/086* (2013.01); *H04R 1/105* (2013.01); *H04R 1/1016* (2013.01); *H04R 1/1075* (2013.01); *H04R 1/1083* (2013.01); *H04R 1/406* (2013.01); *H04R 3/005* (2013.01); *H04R 2201/401* (2013.01)

(58) Field of Classification Search
None
See application file for complete search history.

(56) References Cited

U.S. PATENT DOCUMENTS

| | | | | |
|---|---|---|---|---|
| 2011/0129107 A1* | 6/2011 | Andersen | ............... | H04R 1/083 381/317 |
| 2013/0129107 A1* | 5/2013 | Larson | ................... | H04R 1/083 381/71.7 |
| 2016/0381453 A1* | 12/2016 | Ushakov | .............. | H04R 1/1066 381/71.6 |
| 2019/0246218 A1* | 8/2019 | Hertzberg | ............... | G06F 3/012 |

OTHER PUBLICATIONS

Unknown, "Voyager 6200 UC", data sheet, 2017, 2 pages, Plantronics, Inc.

* cited by examiner

*Primary Examiner* — Antim G Shah
(74) *Attorney, Agent, or Firm* — Ferguson Braswell Fraser Kubasta PC

(57) ABSTRACT

A communication headset includes a neckband with a horseshoe-shaped footprint and two microphone tips disposed at two ends of the neckband, the two ends establishing an aperture of the horseshoe-shaped footprint. Each of the two microphone tips includes a slanted base. The communication headset further includes a microphone array including two sets of microphones in a spatial configuration in which the two sets of microphones are disposed on the slanted bases of the two microphone tips. An effective acoustic spacing between the microphones in the microphone array is at least 15 mm.

19 Claims, 9 Drawing Sheets

NECKBAND HEADSET WITH NOISE REJECTION

BACKGROUND

Communication headsets are devices worn by a user that provide for two-way communication. Communication headsets may be worn, for example, for a user to perform a telephone call to allow the user to both send and receive audio. Users may use communication headsets in a variety of acoustic environments, such as in public spaces, such as crowded restaurants, public transportation, and conference rooms, and private quiet spaces, such as the user's private office. To address factors such as noise, reverberation, and competing sound sources, a communication headset may be equipped with digital signal processing algorithms configured to isolate the voice of the user wearing the communication headset from these other factors.

SUMMARY

In general, in one aspect, one or more embodiments relate to a communication headset including a neckband with a horseshoe-shaped footprint, and two microphone tips disposed at two ends of the neckband. The two ends establishing an aperture of the horseshoe-shaped footprint, where each of the two microphone tips includes a slanted base. The microphone array include two sets of microphones in a spatial configuration in which the two sets of microphones are disposed on the slanted bases of the two microphone tips, with an effective acoustic spacing of at least 15 mm between the microphones in the microphone array.

In general, in one aspect, one or more embodiments relate to a device that includes a microphone tip including a slanted base. The slanted base has a slant angle greater than ten degrees. The device further includes a microphone array including a first microphone located at a first end of the slanted base and a second microphone located at a second end of the slanted base. The first and the second microphones have a first and a second acoustic center, respectively, the first and the second acoustic centers being located at a surface of the microphone tip with an effective acoustic spacing of at least 15 mm.

In general, in one aspect, one or more embodiments relate to a method for manufacturing a communication headset that includes manufacturing a neckband with a horseshoe-shaped footprint. The method further includes appending two microphone tips disposed at two ends of the neckband, the two ends establishing an aperture of the horseshoe-shaped footprint. Each of the two microphone tips comprises a slanted base, where the two microphone tips includes a microphone array including two sets of microphones in a spatial configuration in which the two sets of microphones are disposed on the slanted bases of the two microphone tips, with an effective acoustic spacing of at least 15 mm between the microphones in the microphone array.

Other aspects of the disclosure will be apparent from the following description and the appended claims.

DETAILED DESCRIPTION

Figure 1:
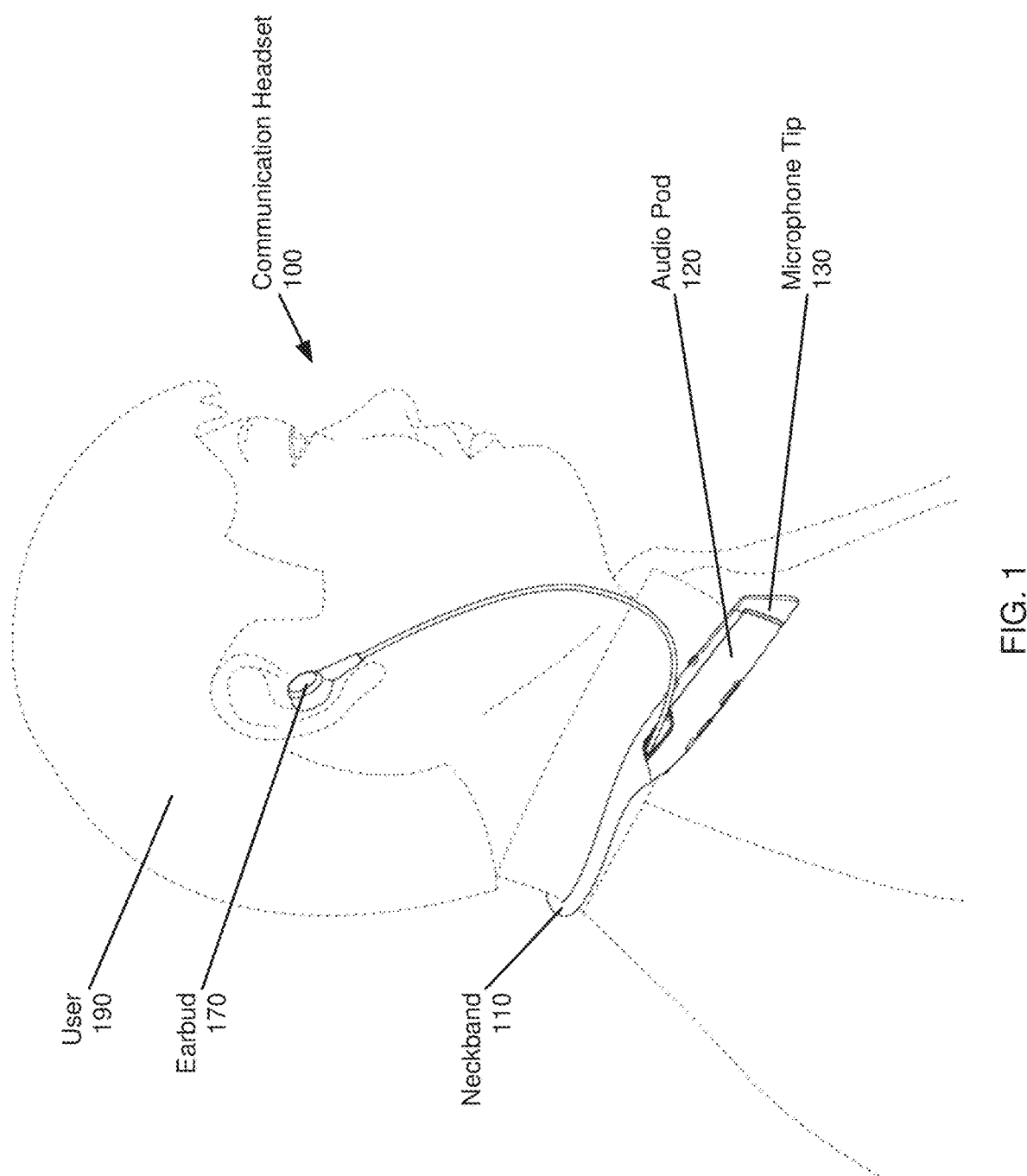
FIG. 1 shows a communication headset worn by a user in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide communication headsets. A communication headset, in accordance with one or more embodiments, supports two-way communications whereby a user is able to receive audio via earphones and is able to provide audio via microphones. The communication headset may perform in various acoustic environments and in presence of noise, reverberation, and competing sound sources. The communication headset may be equipped with digital signal processing (DSP) algorithms configured to isolate the voice signal of a user wearing the communication headset from other audio signals such as those generated by competing speakers. The DSP algorithm may rely on time difference of arrival (TDOA) estimations, beamforming methods, etc., to localize the user's voice in space. In one or more embodiments of the disclosure, an array of microphones is used to enable the DSP algorithm to perform the localization. The DSP algorithm may be configured to track the user's voice while allowing head movement by the user. The DSP algorithm may be able to isolate the user's voice from stationary noise (e.g., ventilation system noise, car noise, etc.) and non-stationary noise (e.g., the voices of competing speakers).

The mechanical design of the communication headset, in one or more embodiments, is based on acoustical engineering considerations that enable better performance of the DSP algorithm, as described below. More specifically, the microphones may be placed and/or oriented in a particular manner, conducive to better performance of the DSP algorithm. As a result, the DSP algorithm may establish a well-defined voice pick-up zone from which audio signals are obtained and passed on, while other audio signals from outside the voice pick-up zone may be suppressed. The user's voice may, thus, be clearly isolated from background noise even in challenging audio environments, such as crowded conference rooms.

Turning to FIG. 1, a communication headset (100) worn by a user (190), in accordance with one or more embodiments of the disclosure, is shown. The communication headset (100) may include a neckband (110), audio pods (120), microphone tips (130), and earbuds (170). Each of these components is subsequently described.

The neckband (110) may have a horseshoe-shaped footprint, configured to be worn by the user (190) around the neck, as illustrated in FIG. 1. The neckband (110) may rest on the user's shoulders, with the aperture formed by the ends of the horseshoe-shaped footprint pointing in a forward direction, relative to the user (190). The neckband (110) may be manufactured from any material including plastic or composite materials. The neckband (110) may be flexible, allowing the user (190) to widen the aperture, e.g., when donning the neckband.

In one or more embodiments of the disclosure, the neckband (110) widens toward the ends of the horseshoe-shaped structure, forming two audio pods (120). The audio pods (120) may be hollow, forming cavities that accommodate headset electronics. The headset electronics may include, for example, one or more batteries, digital signal processing circuits for the microphones of the communication headset, digital signal processing circuits for the speakers of the communication headset, communication circuits (e.g., a Bluetooth interface), charging circuits, etc. Control elements such as volume control buttons, power on/off control buttons, etc., may be disposed on the surface of the audio pods (120).

In one or more embodiments of the disclosure, each of the audio pods (120) terminates in a microphone tip (130). In other words, the microphone tip (130) is located at the forward-facing end of the audio pod (120). As shown, each end of the neckband terminates with a microphone tip (130) such that the microphone tip is located in the front of the user. Each of the microphone tips (130) may be equipped with a set of microphones. The configuration of the microphone tips (130) may be optimized for the DSP algorithm to facilitate isolation of the user's voice from background noise. The optimization may include positioning, orientating and spacing of the microphones disposed in the microphone tips (130), as described below. A detailed description of the microphone tips (130) is provided with reference to FIG. 2.

In one or more embodiments of the disclosure, the earbuds (170) include speakers allowing the communication headset (100) to be used for two-way communications. While only one earbud (170) is shown, the communication headset (100) may be equipped with two earbuds (170) for binaural audio. Cables may connect the earbuds (170) to the neckband (110).

The following FIGS. 2-8 discuss the configuration of the microphone tips (130) on the neckband (110). At least some aspects of the configuration of the microphone tips (130) affect the ability of the DSP algorithm to isolate the user's voice from background noise.

Figure 2:
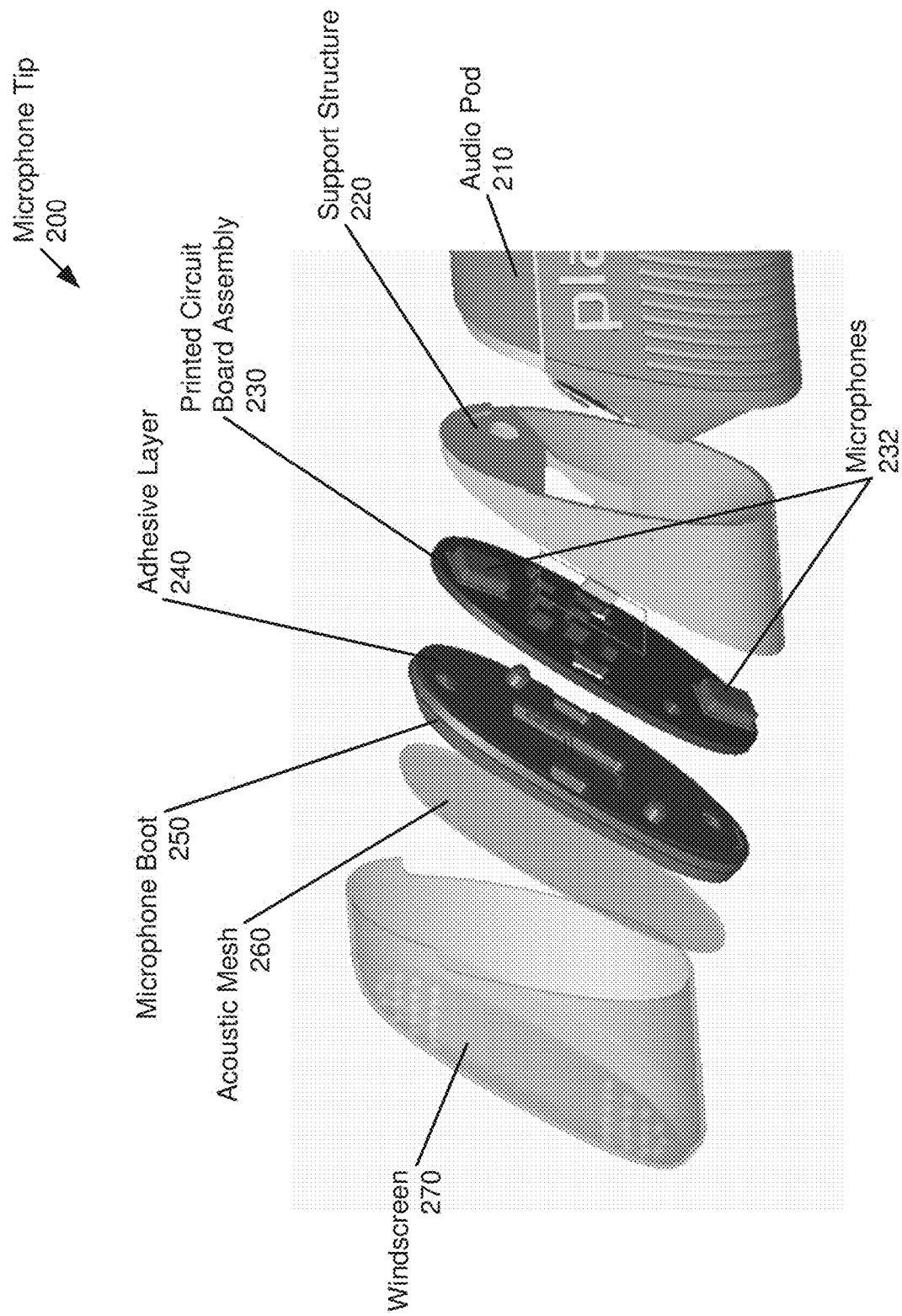
FIG. 2 shows a microphone tip in accordance with one or more embodiments of the disclosure.

Turning to FIG. 2, a microphone tip (200) in accordance with one or more embodiments, is shown. The microphone tip (200) may correspond to the microphone tip (130) introduced in FIG. 1. As previously noted, the communication headset (100) may be equipped with two microphone tips (130). The microphone tip (200) may include features that support the operation of the DSP algorithm. More specifically, each of the two microphone tips (200) includes a set of microphones (232) establishing a microphone array. In one embodiment, each set includes two microphones, thus forming an array of four microphones. The microphones (232) may be spaced and oriented in a particular manner to improve the performance of the DSP algorithm, as further discussed below. Factors that affect the performance of the DSP algorithm include, but are not limited to, the spacing of microphones within the microphone tip (200), the orientation of the microphones relative to the user's mouth, based on an allowed head motion and under consideration of different user body shapes, and the separation between the two microphone tips (200).

The microphone tip (200) may include a support structure (220), a printed circuit board assembly (230) including two microphones (232), an adhesive layer (240), a microphone boot (250), an acoustic mesh (260), and a windscreen (270). Each of these elements is subsequently described with reference to FIGS. 3-7.

Figure 3:
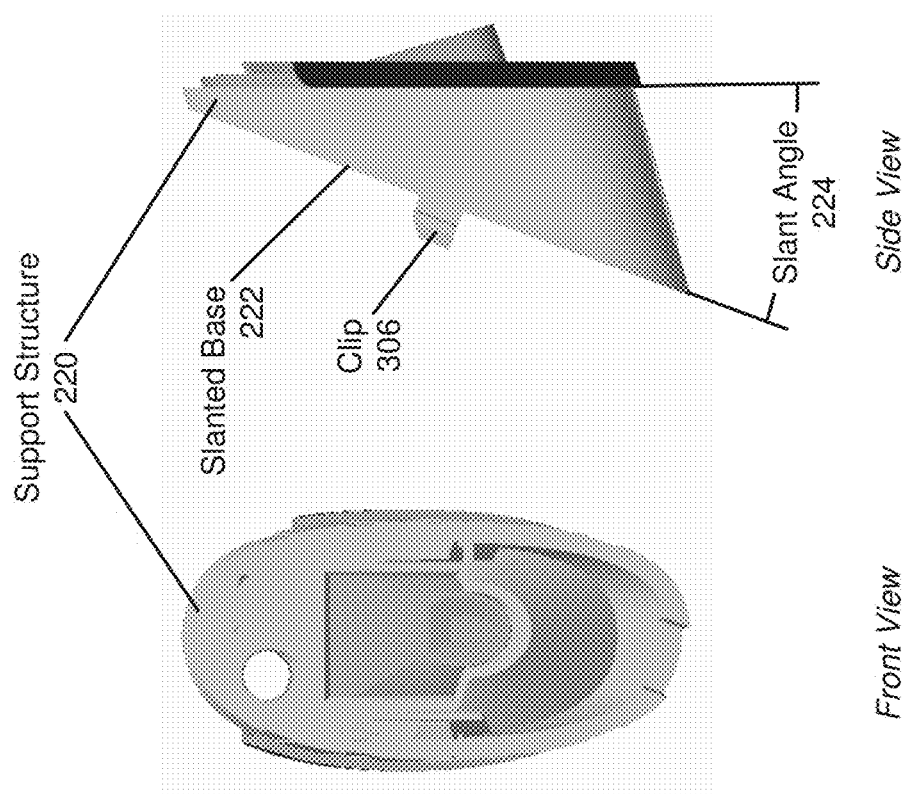
FIG. 3 shows a support structure in accordance with one or more embodiments of the disclosure.

Turning to FIG. 3, a support structure (220), in accordance with one or more embodiments of the disclosure, is shown. In particular, FIG. 3 shows a front view and a side view of the support structure (220). The front view is a view from the windscreen or terminal end toward the audio pod. The side view is a left side view of the support structure (220). The support structure (220) may establish a slanted base (222) for the placement of the microphones (232) of the printed circuit board assembly (230), providing the desired orientation of the microphones (232) relative the user's mouth. In one or more embodiments of the disclosure, the slanted base (222) is oriented at a slant angle (224) selected to achieve all or part of the following design goals: (i) The separation between the microphones (232) may exceed the separation achievable using non-slanted designs due to the additional length of the printed circuit board that accommodates the microphones when installed on the slanted base (222). (ii) The placement of the microphones (232) may be such that an effective acoustic spacing of the microphones is maximized for speech-related frequencies of audio signals (speech) emitted by the user's mouth. Specifically, as the neckband (110) is worn by the user (190) resting on the user's shoulders as shown in FIG. 1, the distance from the user's mouth to a first of the two microphones vs the distance from the user's mouth to a second of the two microphone may be maximally different. Accordingly, a delay between the speech signal arriving at the two microphones may be maximized. (iii) The microphones are oriented in a direction that minimizes the risk of microphone occlusion, e.g., as a result of body contact and clothing covering the microphones. The slant angle (224) of the slanted base is selected to enable the DSP algorithm to perform robustly under a variety of conditions such as head movement including left/right head movement (yaw) and up/down head movement (pitch). The slant angle (224) may be in a range of approximately 18°+/5°. In one embodiment, the slant angle is greater than 10°. In one embodiment, the slant angle (224) is approximately 19°. In comparison to a non-slanted design, multiple millimeters (e.g., up to 4 mm) of microphone separation may be gained. The support structure (220) may be disposed on the audio pod, thereby forming an extension of the audio pod (210), with a slanted base (222). The slanted base may provide mechanical attachment elements to support components to be placed on top of the slanted base (222). For example, clips (306) configured to interface with the microphone boot (250) may extend from the slanted base (222). Further, pinholes may be provided to receive alignment pins of, for example, the microphone boot. The support structure (220) may be made from plastic, metal, composite materials, etc.

Figure 4:
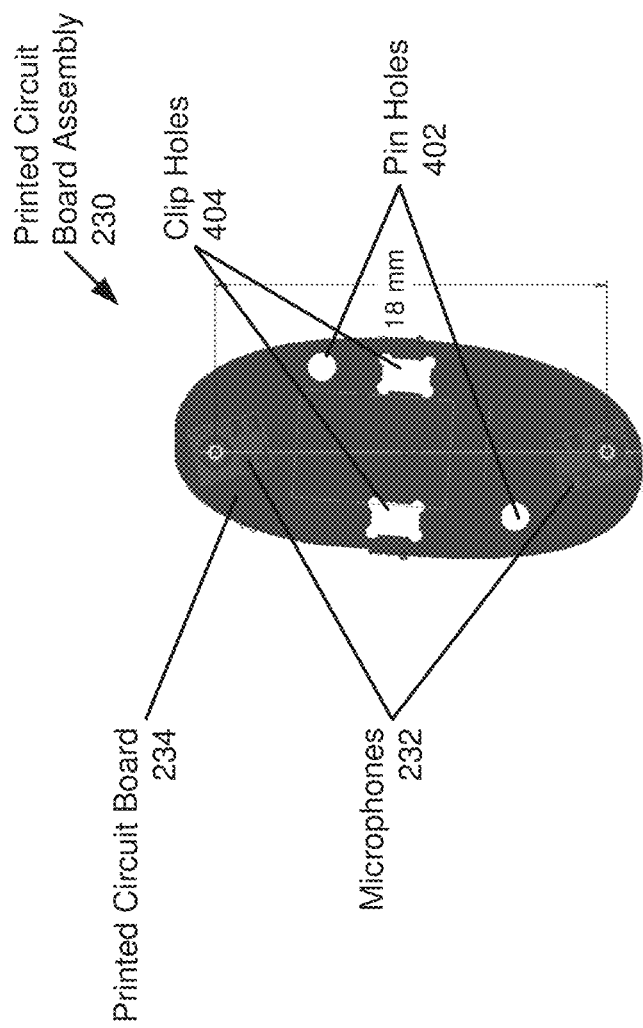
FIG. 4 shows a printed circuit board assembly in accordance with one or more embodiments of the disclosure.

Turning to FIG. 4, a printed circuit board (PCB) assembly (230), in accordance with one or more embodiments of the disclosure, is shown. The printed circuit board assembly (230) includes a printed circuit board (234) carrying at least two microphones (232). The printed circuit board may further carry circuits to process signals obtained from the microphones (232). The printed circuit board may electrically interface with other electronic components located in the audio pod (120). In one or more embodiments, the microphones (232) are spaced to improve the performance of the DSP algorithm. The mechanical spacing of the centers of the microphones may be in the range of 18-20 mm. In one embodiment of the disclosure, the mechanical spacing of the centers of the microphones is 18 mm. The printed circuit boards may further include pin holes (402) to accommodate alignment pins, thereby ensuring a precise positioning of the printed circuit board (234) when flatly disposed on the slanted base (222), and clip holes (404) to accommodate the clips of the support structure.

Figure 5:
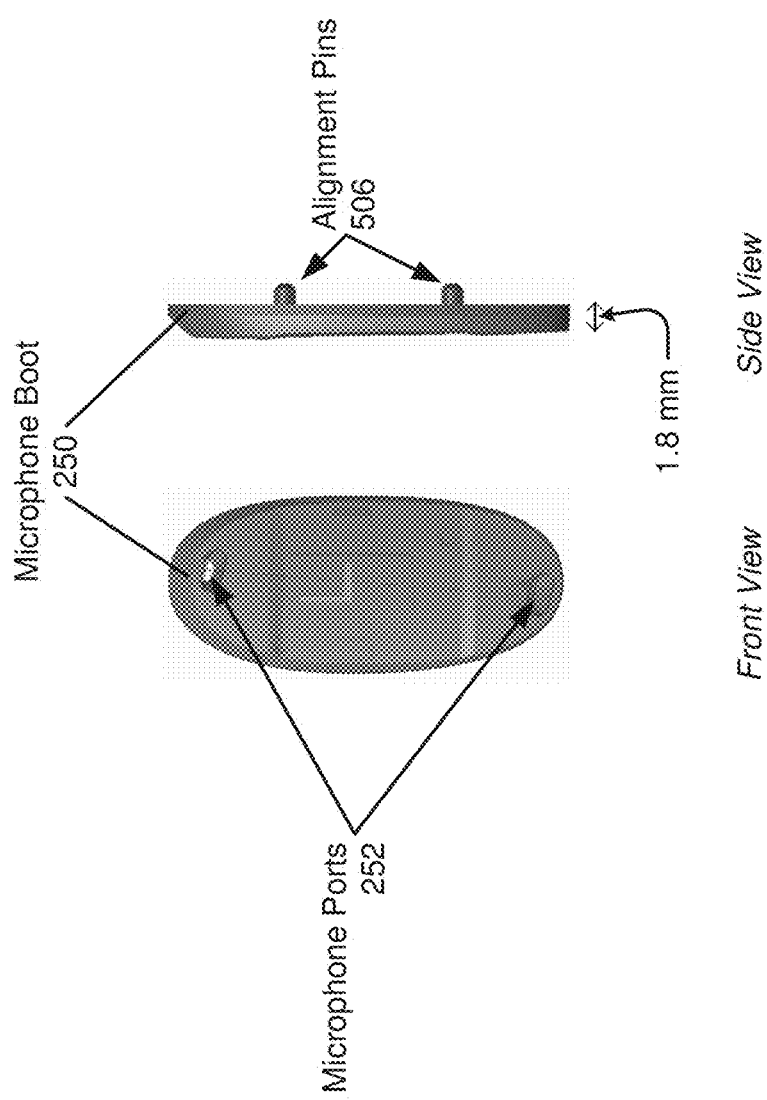
FIG. 5 shows a microphone boot in accordance with one or more embodiments of the disclosure.

Turning to FIG. 5, a microphone boot (250) in accordance with one or more embodiments of the disclosure, is shown. In particular, FIG. 5 shows a front view and a side view of the microphone boot (250). The front view is a view from the windscreen or terminal end toward the audio pod. The side view is a left side view of the microphone boot (250). As illustrated in FIG. 2, the microphone boot (250) covers the printed circuit board (230) and may be attached to the printed circuit board assembly (230) using an adhesive layer (240). Other elements, such as clips or screws, may be used to attach the microphone boot (250) to the printed circuit board. The microphone boot (250) may further include alignment pins (506) that pass through the pin holes of the printed circuit board assembly (230) and interface with the support structure (220) to fixate the printed circuit board assembly (230). In one or more embodiments, the microphone boot (250) includes microphone ports (252). On the PCB-facing side (not shown) of the microphone boot (250), the microphone ports (252) may be aligned with the centers of the microphones (232) to optimize conduction of incoming soundwaves toward the microphones (232). On the PCB-facing side of the microphone boot (250), the microphone ports (252) may be circular holes. On the outward-facing side of the microphone boot (250), the microphone ports (252) may widen to form, for example an obround, oval, or elliptical shape. In other words, the shape and dimensions of the apertures of the microphone ports (252) may vary along the length of the microphone ports. In one or more embodiments, the flaring microphone ports reduce or prevent acoustic resonances in the microphone ports, at audio frequencies relevant for speech transmission. The flaring may shift resonances to a higher frequency range, for example, beyond 7.3 kHz. To further reduce the potential for resonances, the thickness of the microphone boot (250) may be limited to a few millimeters. The microphone boot (250) may be, for example, 1.8 mm thick. The microphone ports (252) may further diverge, to further separate the acoustic centers associated with the microphones (232). For example, on the PCB-facing side of the microphone boot (250), the spacing of the microphone ports (252) may be approximately 18 mm, based on the spacing of the centers of the microphones, whereas on the outward-facing side of the microphone boot (250), the spacing of the microphone ports may be approximately 18.8 mm. In one or more embodiments, the microphone boot establishes a distance of the microphones (232) away from the outside environment at the surface of the windscreen (270) to provide protection to the microphones, e.g., against electrostatic discharge. The microphone boot (250) may be made from plastic, rubber, silicone, etc.

Figure 6:
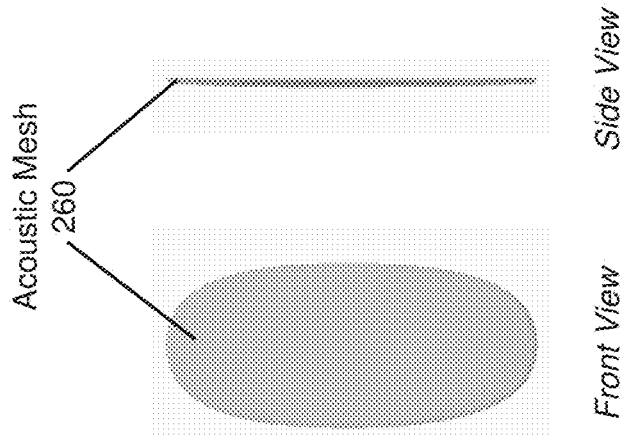
FIG. 6 shows an acoustic mesh in accordance with one or more embodiments of the disclosure.

Turning to FIG. 6, an acoustic mesh (260), in accordance with one or more embodiment of the disclosure, is shown. The acoustic mesh may be a thin membrane (e.g., a silicone membrane) configured to protect the microphones (232) from dust, water, and/or other contaminants. The acoustic mesh may be acoustically transparent to allow for the free flow of sound through the mesh. More specifically, the acoustic mesh (260), in one embodiment, is acoustically transparent at audio frequencies used for the transmission of human speech, while attenuating frequencies that are not relevant for the transmission of human speech. For example, the acoustic mesh (260) may have bandpass characteristics with acoustic transparency at frequencies between approximately 80 Hz and 7.3 kHz. The attenuation provided by the acoustic mesh (260) may result in a damping of frequencies where resonances may occur in the microphone ports. The acoustic mesh may be flatly disposed on the outward-facing surface of the microphone boot (250) and may be held in place by the windscreen (270) placed on top. An adhesive, e.g. an adhesive tape, may further be used to affix the acoustic mesh (260) to the windscreen (270) at the periphery of the acoustic mesh (260).

Figure 7:
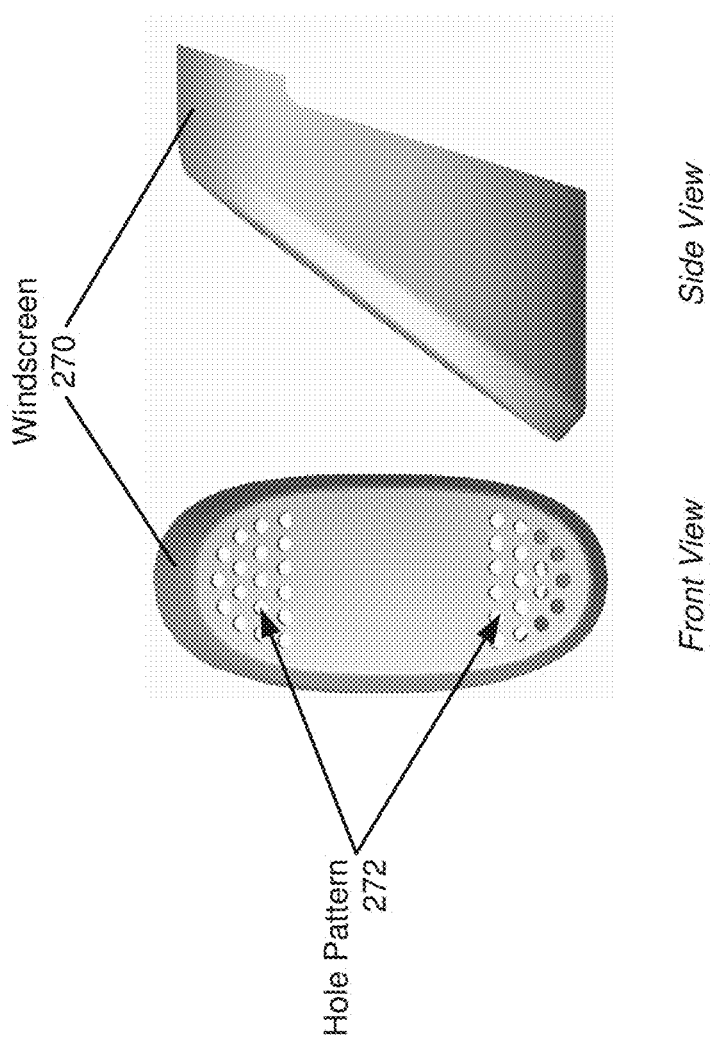
FIG. 7 shows a windscreen in accordance with one or more embodiments of the disclosure.

Turning to FIG. 7, a windscreen (270), in accordance with one or more embodiments of the disclosure, is shown. The windscreen (270) may form an end cap of the microphone tip (200), enclosing the acoustic mesh (260), the microphone boot (250), the adhesive layer (240), and/or the printed circuit board assembly (230). At the end surface of the windscreen (270), above the acoustic mesh (260), a hole pattern (272) may allow soundwaves to enter the microphone tip (200) and to travel toward the microphones (232) through the acoustic mesh (260) and via the microphone ports (252) in the microphone boot (250). In the embodiment shown in FIG. 7, the hole pattern (272) includes two halves, providing a user with a visual indication for the presence of two microphones. The windscreen (270) may form a mechanical barrier and may help reduce wind noise, while maintaining the spacing of the acoustic centers of the microphones (232). The windscreen (270) may be a sheet metal part and may clip onto or may be adhesively attached to the support structure (220) and/or the audio pod (210). In one embodiment, the windscreen (270) is formed of a thin layer of aluminum. Accordingly, the limited depth of the holes of the hole pattern (272) avoids the generation of additional acoustic resonances as sound passes through the holes.

Figure 8:
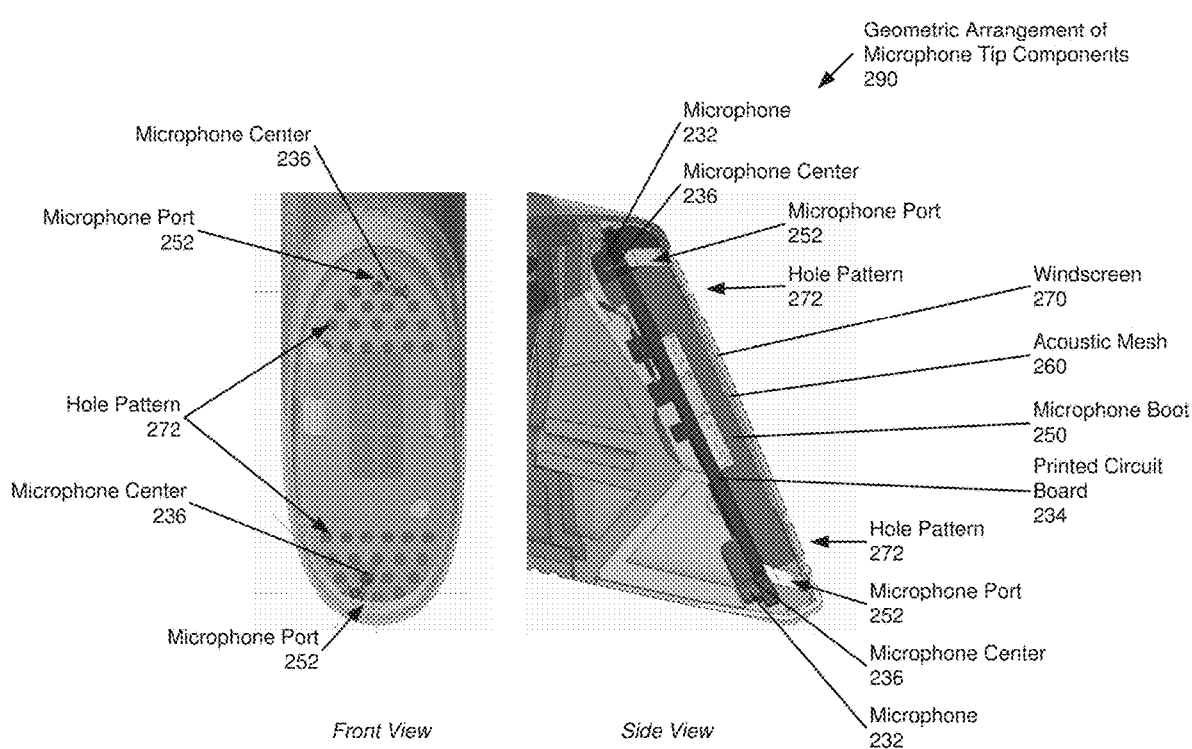
FIG. 8 shows a geometric arrangement of microphone tip components in accordance with one or more embodiments of the disclosure.

FIG. 8 shows the geometric arrangement (290) of the microphone tip components when assembled. In addition to the previously described components, the microphone centers (236) are indicated. The microphone centers (236) are spaced apart approximately 18 mm, enabled by the slanted design of the microphone tip (200). In other words, without modifying the vertical width of the audio pod, because of the slant angle, a better separation of the microphones is achieved. Further, the microphone ports (252), each aligned with a microphone center (236) on the inner surface of the microphone boot (250) and aligned with two holes of the hole pattern (272) on the outer surface of the microphone boot (250) provide an effective acoustic spacing of the microphones (232) of approximately 18.5 mm, over the frequency range relevant for speech transmission. Those skilled in the art will appreciate that different effective acoustic spacings may be used without departing from the disclosure. For example, the effective acoustic spacing may be at least 15 mm, at least 16 mm, at least 17 mm, at least 18 mm, etc. The increased effective acoustic spacing over non-slanted designs, in combination with the orientation of the microphones relative to the face of the user, enables the DSP algorithm to more reliably isolate the user's voice from noise, including voices of other surrounding speakers when operating the two pairs of microphones (232) in the two microphone tips (200) in tandem as a quad-microphone array. In one or more embodiments, the effective acoustic spacing is a result of the geometric arrangement of microphone tip components (290) as described, based on acoustic engineering and physics. It is the effective acoustic spacing rather than the actual or physical spacing of the microphones in a microphone tip that governs the spatial selectivity achievable by the DSP algorithm, for example, based on the inter-channel acoustic delay between the microphones in the array, phase shifts, etc.

The configuration of a microphone tip (200) shown in FIG. 8 in combination with a known range of microphone orientations relative to the user's mouth resulting from differing body shapes of potential users wearing the communication headset may provide audio signals with characteristics that are optimal or near optimal for the DSP algorithm to more reliably isolate the voice and rejecting nearby talker noise. More specifically, the acoustic centers of the microphones in a microphone tip are located at the surface of the microphone tip, with a maximally obtainable spacing. The spacing of the acoustic centers is obtained through a combination of coordinated, interdependent design measures including (i) maximizing the mechanical spacing of the microphones on the slanted base; (ii) suppressing acoustic resonances at audio frequencies relevant for speech transmission using flaring microphone ports; (iii) attenuating frequencies where resonances may occur using an acoustic mesh with bandpass characteristics; and (iv) using a thin-walled windscreen to avoid creating additional resonances. The increased effective spacing of the acoustic centers of the two microphones, in one or more embodiments, improves the performance of a voice active detection (VAD) executed by the DSP algorithm. As a result of the improved VAD performance, the isolation of the voice improves, and in addition, robustness of the DSP algorithm (for example against head movement of the user) may also improve.

In one or more embodiments, the frequency responses of the microphones in a microphone tip are similar or identical, as a result of the described design. Accordingly, the DSP algorithm may operate in a similar manner on the signals obtained from all microphones without requiring additional filtering, thereby enabling the use of low power DSPs to obtain the described superior performance in one or more embodiments.

While a range of effective spacings of the acoustic centers of the two microphones in a microphone tip of up to 22 mm may provide good DSP algorithm performance, other constraints may suggest the use of an 18 mm spacing to achieve various benefits. In one or more embodiments, the communication headset may be used with two ear-buds, with only the left earbud, or only the right earbud without affecting the performance of the DSP algorithm isolating the user's voice. To support all of these scenarios, an installation of microphones in pods on the earbud cables would not be feasible because wearing only a single earbud (with the other earbud "dangling") would drastically alter the geometry of the microphone array. In contrast, the integration of the microphones in the microphone tips of the neckband, in accordance with one or more embodiments, does provide reliable microphone array performance regardless of the earbud configuration. Accordingly, the communication headset as described enables isolation of the user's voice and rejection of nearby talker noise in situations in which a single earbud is used, such as when operating a vehicle.

In one or more embodiments, due to the slanted design of the microphone tips, the desired effective acoustic spacing is achieved without necessitating aesthetically and/or functionally undesirable large microphone tips.

In one or more embodiments, the microphones in the microphone tip are placed on a single surface that is unlikely to be occluded by body contact or clothing, unlike in alternative implementations in which microphones are placed on opposing surfaces.

In one or more embodiments, the configuration of the quad-microphone array provides the flexibility to support a range of separations between the two microphone tips. In other words, the tips may be separated from each other at a variety of distances without affecting performance. The separation may vary based on neck size (for example, a wider neck or wearing additional clothing such as a scarf may increase the separation).

In one or more embodiments, the configuration of the quad-microphone array enables robust tracking of the user's voice over a wide range of head movements by the user, including a head rotation of up to +/−90°.

In one or more embodiments, due to protective barriers such as the windscreen, the acoustic mesh, the microphone boot and adhesives, the communication headset is robust against dirt, moisture, oils, and other human-related environmental factors, impact, mechanical abuse, etc.

In one or more embodiments, the described arrangement of the components of the communication headset results in measurably superior performance in comparison to conventional, non-slanted designs. To objectively quantify the performance improvements, pseudo mean opinion scores (MOS) were obtained. Speech pseudo MOS (S-MOS) were obtained in the absence of noise, and noise pseudo MOS (N-MOS) were obtained in the presence of noise. The S-MOS scores increased from 3.61 (conventional design) to 3.89 (design in accordance with an embodiment of the disclosure). The N-MOS scores increased from 3.47 (conventional design) to 3.97 (design in accordance with an embodiment of the disclosure). The measurements suggest that up to 5 dB of nearby talker noise are removed, corresponding to an approximately 40% reduction in the nearby talker noise. Simultaneously, the perceived speech quality was found to increase.

One skilled in the art will recognize that the design of the communication headset is not limited to the examples shown in FIGS. 1-8. Specifically, for example, design parameters may deviate from the illustrations, as long as the geometry of the quad-microphone array as described is not violated.

Figure 9:
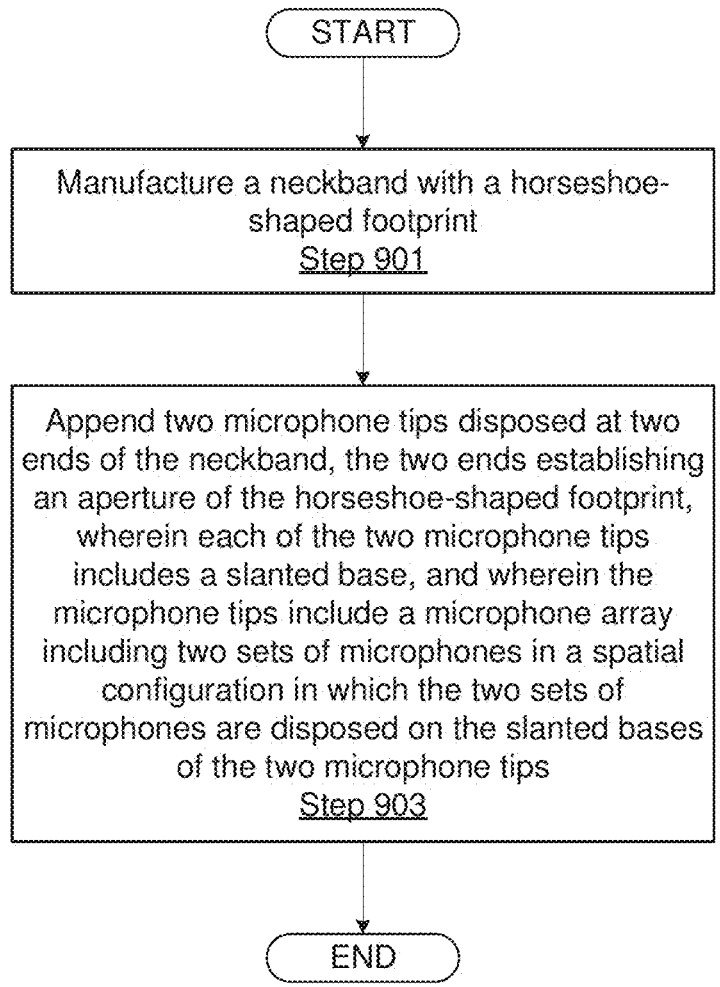
FIG. 9 shows a flowchart in accordance with one or more embodiments of the disclosure.

FIG. 9 shows a flowchart of a method of manufacturing a communication headset in accordance with one or more embodiments. In Step 901, a neckband with a horseshoe shaped footprint is manufactured. In Step 903, two microphone tips disposed at two ends of the neckband are appended to the neckband. The two ends establish an aperture of the horseshoe-shaped footprint, wherein each of the two microphone tips includes a slanted base, and wherein the microphone tips include a microphone array including two sets of microphones in a spatial configuration in which the two sets of microphones are disposed on the slanted bases of the two microphone tips.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A communication headset comprising:
   a neckband with a horseshoe-shaped footprint, comprising surfaces extending along a length of the horseshoe-shaped footprint and having at least one width perpendicular to the length;
   two microphone tips disposed at two ends of the neckband, wherein each of the two microphone tips comprises a support structure having a slanted base, the support structure having a first side extending along the length, a second side extending along the at least one width, and a third side forming the slanted base, the slanted base forming a slant angle greater than ten degrees with the second side and being defined by the first side and the second side; and
   a microphone array comprising two sets of microphones in a spatial configuration in which the two sets of microphones are disposed on the slanted bases of the two microphone tips, and each comprising at least two microphones disposed at two endpoints of the slanted bases with an effective acoustic spacing of at least 15 mm between the at least two microphones.

2. The communication headset of claim 1, wherein the microphone array is a quad-microphone array, and wherein each of the two sets of microphones comprises two microphones.

3. The communication headset of claim 1, wherein a mechanical spacing of the microphones in a set of microphones is maximized on the slanted base.

4. The communication headset of claim 3, wherein the mechanical spacing exceeds a separation achievable on a non-slanted base.

5. The communication headset of claim 3, wherein the mechanical spacing is 18 millimeters.

6. The communication headset of claim 3, wherein the slant angle of the slanted base is selected to maximize the effective acoustic spacing of the microphones in the set of microphones.

7. The communication headset of claim 1, further comprising a printed circuit board flatly disposed on the slanted base,
   wherein one of the two sets of microphones is disposed on the printed circuit board.

8. The communication headset of claim 7, further comprising a microphone boot, wherein the microphone boot comprises a set of microphone ports for the set of microphones, configured to conduct audio signals toward the set of microphones.

9. The communication headset of claim 8, wherein the set of microphone ports flare from a printed circuit board-facing side of the microphone boot to an outward-facing side of the microphone boot.

10. The communication headset of claim 8, wherein the set of microphone ports diverge from a printed circuit board-facing side of the microphone boot to an outward-facing side of the microphone boot.

11. The communication headset of claim 8, further comprising a windscreen forming a cap enclosing the printed circuit board and the microphone boot, the windscreen comprising a hole pattern aligned with the set of microphone ports.

12. The communication headset of claim 11, further comprising an acoustic mesh disposed between the microphone boot and the windscreen.

13. The communication headset of claim 1, further comprising a digital signal processor (DSP) configured to receive audio signals from the microphone array.

14. The communication headset of claim 13, wherein the DSP is configured to isolate a user's voice from voices of other surrounding speakers, using the audio signals from the microphone array.

15. The communication headset of claim 13, wherein the DSP is configured to establish a voice pick-up zone around a user's head based on the spatial configuration of the microphone array,
   wherein the DSP passes audio signals originating from inside the voice pick-up zone, and
   wherein the DSP suppresses audio signals originating from outside the voice pick-up zone.

16. The communication headset of claim 1, further comprising an audio pod configured to accommodate electronics of the communication headset, wherein the audio pod is a widened section of the neckband.

17. The communication headset of claim 16, further comprising control elements disposed on the surface of the audio pod.

18. The communication headset of claim 1, further comprising earbuds.

19. A method for manufacturing a communication headset, the method comprising:
   manufacturing a neckband with a horseshoe-shaped footprint, comprising surfaces extending along a length of the horseshoe-shaped footprint and having at least one width perpendicular to the length; and
   appending two microphone tips disposed at two ends of the neckband, wherein each of the two microphone tips comprises a support structure having a slanted base, the support structure having a first side extending along the length, a second side extending along the at least one width, and a third side forming the slanted base, the slanted base forming a slant angle greater than ten degrees with the second side and being defined by the first side and the second side,
   wherein the two microphone tips comprise a microphone array comprising two sets of microphones in a spatial configuration in which the two sets of microphones are disposed on the slanted bases of the two microphone tips and each comprising at least two microphones disposed at two endpoints of the slanted bases with an effective acoustic spacing of at least 15 mm between the at least two microphones.

* * * * *